US011722895B2

(12) United States Patent
Chauhan

(10) Patent No.: US 11,722,895 B2
(45) Date of Patent: Aug. 8, 2023

(54) RADIO FREQUENCY COMMUNICATIONS DETECTION FOR SUBSCRIBER ACCESS CONTROL

(71) Applicant: T-Mobile USA, Inc., Bellevue, WA (US)

(72) Inventor: Kanakrai Chauhan, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 329 days.

(21) Appl. No.: 16/897,186

(22) Filed: Jun. 9, 2020

(65) Prior Publication Data

US 2021/0385655 A1 Dec. 9, 2021

(51) Int. Cl.
| | |
|---|---|
| *H04W 12/08* | (2021.01) |
| *H04W 8/18* | (2009.01) |
| *H04W 12/02* | (2009.01) |
| *H04L 9/32* | (2006.01) |
| *G06Q 20/12* | (2012.01) |
| *G06Q 20/40* | (2012.01) |
| *G06Q 20/32* | (2012.01) |
| *H04W 72/04* | (2023.01) |
| *H04W 4/80* | (2018.01) |

(Continued)

(52) U.S. Cl.
CPC .......... *H04W 12/08* (2013.01); *G06Q 20/127* (2013.01); *G06Q 20/326* (2020.05); *G06Q 20/40* (2013.01); *H04L 9/0643* (2013.01); *H04L 9/3236* (2013.01); *H04W 4/80* (2018.02); *H04W 8/18* (2013.01); *H04W 12/02* (2013.01); *H04W 12/40* (2021.01); *H04W 12/61* (2021.01); *H04W 12/63* (2021.01); *H04W 24/08* (2013.01); *H04W 48/16* (2013.01); *H04W 72/04* (2013.01)

(58) Field of Classification Search
CPC ..... H04W 12/02; H04W 12/40; H04W 12/63; H04W 24/08; H04W 48/16; H04W 12/69; H04W 12/08; H04W 4/80; H04W 72/04; H04W 12/61; H04W 8/18; H04L 9/0643; H04L 9/3239; H04L 9/3236
See application file for complete search history.

(56) References Cited

U.S. PATENT DOCUMENTS

| | | |
|---|---|---|
| 7,509,131 B2 | 3/2009 | Krumm et al. |
| 8,331,228 B2 | 12/2012 | Huber et al. |

(Continued)

*Primary Examiner* — Anez C Ebrahim
(74) *Attorney, Agent, or Firm* — Han Santos, PLLC

(57) ABSTRACT

A radio frequency (RF) communication that is transmitted by a subscriber device to a base station of a wireless carrier network on a corresponding allocated communication frequency of the wireless carrier network is monitored. A device identifier of the subscriber device is extracted from the RF communication and sent to a core network of the wireless carrier network for an indication of whether a subscriber associated with the subscriber device is eligible to access a resource. In response to receiving a notification from the core network that the subscriber is eligible to access the resource, whether the subscriber device with the device identifier is permitted to access the resource is determined based at least on device access information stored in an access control database of the device. The subscriber device is granted access when the device access information indicates that the subscriber device is permitted to access the resource.

20 Claims, 5 Drawing Sheets

(51) Int. Cl.
*H04W 48/16* (2009.01)
*H04W 24/08* (2009.01)
*H04L 9/06* (2006.01)
*H04W 12/40* (2021.01)
*H04W 12/61* (2021.01)
*H04W 12/63* (2021.01)

(56) References Cited

U.S. PATENT DOCUMENTS

| | | | |
|---|---|---|---|
| 8,437,741 B2 | 5/2013 | Salkini et al. | |
| 2014/0337950 A1* | 11/2014 | Yang | H04L 9/3297 726/7 |
| 2020/0404365 A1* | 12/2020 | Phillips | H04N 21/4415 |
| 2021/0092605 A1* | 3/2021 | Draznin | H04L 63/0281 |
| 2021/0233073 A1* | 7/2021 | Ene | G06Q 20/409 |

* cited by examiner

RADIO FREQUENCY COMMUNICATIONS DETECTION FOR SUBSCRIBER ACCESS CONTROL

BACKGROUND

A mobile network operator (MNO) may push promotion information to mobile applications that are installed on user devices to notify customers of current promotion campaigns, e.g., offers, deals, discounts, gifts, and/or prizes. The promotion campaigns may be sponsored by the MNO or sponsored by third-party business partners of the MNO. In some instances, such promotion campaigns may provide subscribers of the MNO with special access to certain venues or events, the ability to preferentially take advantage of certain product or service offers, as well as other benefits. Accordingly, the promotion campaigns may create positive social feedback, business goodwill, and consumer excitement regarding the product and service offerings of the MNO.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

Figure 1:
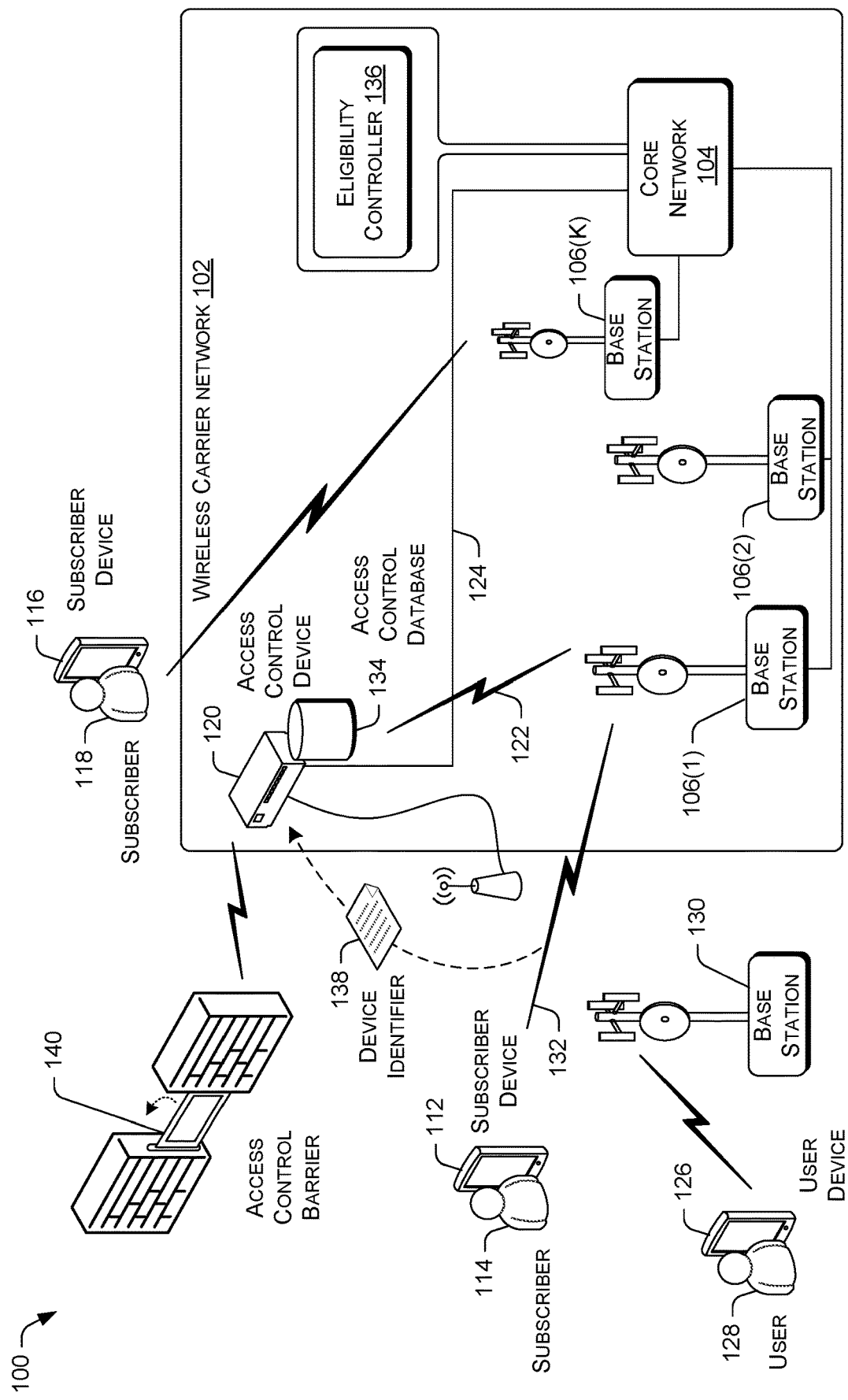
FIG. 1 illustrates an example architecture for a mobile network operator (MNO) to use radio frequency (RF) communications detection to control subscriber access to resources.

This disclosure is directed to techniques that enable a mobile network operator (MNO) to provide subscribers of a wireless carrier network operated by the MNO with access to certain resources located at particular geolocations. For example, the resources may include access to a venue for a special event located at a particular geolocation, access to an online resource (e.g., a multimedia file) at the particular geolocation, and/or an authorization to performance a purchase transaction to purchase products and/or services at the particular geolocation. In various embodiments, an access control device may be deployed to the particular geolocation. The access control device may monitor RF communications transmitted by subscriber devices on licensed communication frequency bands allocated to the wireless carrier network operated by the MNO. In some instances, the access control device may be a modified low-powered network cell, such as a picocell or femtocell. By monitoring RF communications transmitted by the subscriber device on these frequency bands, the access control device is able to extract a device identifier of each subscriber device in the proximity of the access control device. For example, a device identifier may include an International Mobile Subscriber Identity (IMSI), an International Mobile Equipment Identity (IMEI), a Mobile Station International Subscriber Directory Number (MSISDN), and/or so forth. The access control device may send the device identifier of each subscriber device to an eligibility controller in the core network of the wireless carrier network. In turn, the eligibility controller may determine whether a subscriber using each subscriber device is eligible for accessing a resource at the particular geolocation.

Subsequently, if the access control device is notified that the subscriber is eligible for accessing the resource at the particular geolocation, the access control device may use an access control database of the access control device to determine whether the subscriber device is permitted to access the resource. The access control database may contain device access records and one or more access rules. For example, an access rule may specify that a subscriber device is permitted to access a resource only once or for a limited number of times. Thus, if the subscriber device was already used to access the resource, the access control database may contain a device access record documenting the access. Accordingly, the subscriber device may be denied access if no additional access is permitted. Otherwise, the subscriber device is granted access to the resource. For example, granting resource access may include actuating an access control barrier to let a person in possession of the subscriber device entry into a venue (e.g., a zoo, a concert, a museum, etc.) located at the particular geolocation, allowing an application on the subscriber device to access an online resource (e.g., a multimedia presentation) at the particular geolocation, or authorize the application to be used to perform a purchase transaction (e.g., purchase products and/or services) using a subscriber account of the subscriber at the particular geolocation.

The techniques may enable an MNO to selectively provide subscribers of the MNO with access to resources at various geolocations without the subscribers having to keep track of and sign up in advance for access to such resources. For example, previous techniques for providing subscribers with access to resources associated with promotions may involve having subscribers sign up in advance to periodically receive electronic communications regarding the promotions offered at specific days and/or times. The subscribers are then expected to download electronic tokens or coupons (e.g., Quick Response (QR) codes) for the promotions and present the tokens or coupons to access the resources at specific locations or otherwise redeem the offers associated with the promotions. In other words, a subscriber may have to perform multiple steps before the subscriber is able to take advantage of the promotions. As a result, some subscribers may be reluctant to participate in promotions sponsored by the MNO because they find the number of steps tedious or time consuming. In contrast, by automatically detecting subscriber devices and granting subscribers with access to resources based on the identities of their subscriber devices, the techniques may provide a more convenient way for subscribers to take advantage of promotions and offers sponsored by the MNO. The techniques described herein may be implemented in a number of ways. Example implementations are provided below with reference to the following figures.

Example Architecture

FIG. 1 illustrates an example architecture 100 for a mobile network operator (MNO) to use radio frequency (RF) communications detection to control subscriber access to resources. The MNO may operate a wireless carrier network 102 that may provide a wide range of mobile communication services, as well as ancillary services and features, to subscribers and associated mobile device users. In various embodiments, the wireless carrier network 102 may provide wireless communication between multiple user devices. Further, the wireless carrier network 102 may also provide communications between the multiple user devices and user devices that are serviced by other telecommunications networks. The telecommunication services provided may include voice communication, multimedia communication, data communication, such as email, messaging, content streaming, content uploading, and/or so forth.

The wireless carrier network 102 may be implemented using multiple interconnected networks. In various embodiments, the wireless carrier network 102 may include multiple Radio Access Networks (RANs). The RANs may be connected to each other via regional ground networks. In turn, the regional ground networks may be connected to a core network 104 by a wide area network (WAN). Each regional portion of the wireless carrier network 102 may include one or more RANs and a regional circuit and/or packet-switched network and associated signaling network facilities. The wireless carrier network 102 may provide telecommunication services in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), 5th Generation (5G), and/or so forth.

A RAN of the wireless carrier network 102 may include a number of base stations, such as the base stations 106(1)-106(K), also referred to as network cells. In some embodiments, the base stations may be in the form of nodes. Each node may include a base transceiver system (BTS) that communicates via an antenna system over an air-link with one or more user devices that are within range. The BTS may send radio communication signals to user devices and receive radio communication signals from user devices. The RANs may carry the communications of the user devices between the respective base stations and the core network 104. The core network 104 may include components that support 2G and 3G voice communication traffic, as well as 3G, 4G, and 5G data communication traffic. For example, 3G data communication traffic between a user device and the Internet may be routed through a gateway of a 3G Packet Switch (PS) Core. On the other hand, 3G voice communication traffic between the user device and a Public Switched Telephone Network (PSTN) may be routed through a Mobile Switch (MSC) of a 3G Circuit Switch (CS) core. The core network 104 may further include components that support 4G and 5G voice and data communication traffic. Such components may include an Evolved Packet Core (EPC) and an IP Multimedia Subsystem (IMS) core. The IMS core may provide the user devices with data access to external packet data networks, such as the networks of other wireless telecommunication providers, as well as backend servers in the core network 104. The core network 104 may connect to a public packet data communication network, such as the Internet 110, via one or more gateways. Accordingly, data and voice communications via the RANs, the core network, and the Internet 110 may support a variety of telecommunication services through the wireless carrier network 102. The wireless carrier network 102 may provide telecommunication services to multiple user devices. In some instances, the user devices may include smartphones, tablet computers, embedded computer systems, or any other device that is capable of using the wireless communication services that are provided by the wireless carrier network 102. For example, the base station 106(1) may be used to provide telecommunication services to a subscriber device 112 of a subscriber 114. Likewise, the base station 106(K) may be used to provide telecommunication services to a subscriber device 116 of a subscriber 118.

An access control device 120 may be deployed by the MNO to a particular geolocation to monitor RF communications that are transmitted by subscriber devices to a nearby base station (e.g., base station 106(1)) via radio frequency bands that are licensed for use by the wireless carrier network 102. The access control device 120 may be communicatively coupled to the core network 104 via a wireless communication connection 122 or a wired communication connection 124. For example, the access control device 120 may establish a wireless telecommunication connection with a base station, such as the base station 106(1), so that the base station may relay communication between access control device 120 and the core network 104. In another example, the access control device 120 may be connected to the core network 104 via one or more wired networks, such as a dedicated backhaul or the Internet. In this way, the access control device 120 may use the monitored RF communications to control subscriber access to a resource at the particular geolocation. For example, the subscriber device 112 may send RF communications to the base station 106(1) of the wireless carrier network 102 via radio frequency bands that are licensed for use by the wireless carrier network 102. In such an example, the radio frequency bands may include frequency bands in the 600 MHz and the 1260 MHz range. In contrast, a user device 126 of a user 128 may be exchanging RF communications with a base station 130 of a different wireless carrier network that is operated by another MNO using other radio frequency bands. In this way, the access control device 120 may monitor the RF communications of subscriber devices like the subscriber device 112, while RF communications of user devices like the user device 126 are intentionally not monitored by the access control device 120.

In various embodiments, the RF communications 132 transmitted by the subscriber device 112 may include a device identifier of the subscriber device 112. Such RF communications are routed by the base station 106(1) to the core network 104 of the wireless carrier network 102. The RF communications may include periodic status pings to the wireless carrier network 102, answers to network pages for incoming calls or messages, outgoing calls, data sessions initiated by applications on the subscriber device 112, such as pull sessions that check for messages or emails, data sessions for data that are initiated by the subscriber 114, location/cell identifier updates initiated by the subscriber device 112 due to handover between base stations, and/or so forth. Accordingly, the access control device 120 may capture the device identifier 138 of the subscriber device 112 when the subscriber device 112 is in the proximity of the access control device 120. For example, a device identifier 138 of the subscriber device 112 may include an IMSI, an IMEI, an MSISDN, and/or some other similar device identifier.

The access control device 120 may send the device identifier 138 of the subscriber device 112 to an eligibility controller 136 in the core network 104 of the wireless carrier network 102. In turn, the eligibility controller 136 may determine whether a subscriber associated with the subscriber device 112 is eligible for accessing a resource at a particular geolocation. The eligibility controller 136 may be software that is implemented by one or more computing nodes of the core network 104.

In various embodiments, the eligibility of the subscriber may be determined based on the type of subscriber account that the subscriber has with the MNO (e.g., prepaid account vs. postpaid account), whether the subscriber is current on payments to the MNO for telecommunication services, the age of the subscriber, and/or one or more other eligibility criteria. Subsequently, if the access control device 120 is notified by the eligibility controller 136 that the subscriber is eligible for accessing the resource at the particular geolocation, the access control device 120 may use an access control database 134 that is local to the access control device 120 to determine whether the subscriber device is permitted to access the resource. For example, the access control database 134 may be a database that is stored in the memory of the access control device 120. The access control database 134 may contain device access information in the form of device access records and one or more access rules that regulate access to resources. For example, an access rule may dictate that the subscriber device 112 is permitted to access a resource only once or for a limited number of times. In another example, an access rule may specify that the subscriber device 112 is permitted to access a resource only once or for a limited number of times in a predetermined time period. Thus, if the subscriber device 112 was already used to access the resource, the access control database 134 may contain a device access record documenting the access. Accordingly, the subscriber device 112 may be denied access if no additional access is permitted. Otherwise, the subscriber device 112 is granted access to the resource by the access control device 120. Alternatively, or concurrently, an access rule may dictate that the subscriber device 112 is only allowed to access a resource at a specific date and/or time.

In some instances, granting access to a resource may include the access control device 120 actuating an access control barrier 140 to let a person (e.g., the subscriber 114) in possession of the subscriber device 112 entry into a venue (e.g., zoo, concert, etc.) located at the particular geolocation. Alternatively, or concurrently, granting access to a resource may include allowing an application on the subscriber device 112 to access an online resource (e.g., a multimedia presentation) at the particular geolocation, and/or authorize the application to perform a purchase transaction (e.g., purchase products and/or services) using a subscriber account of the subscriber 114 at the particular geolocation.

Example Access Control Device Components

Figure 2:
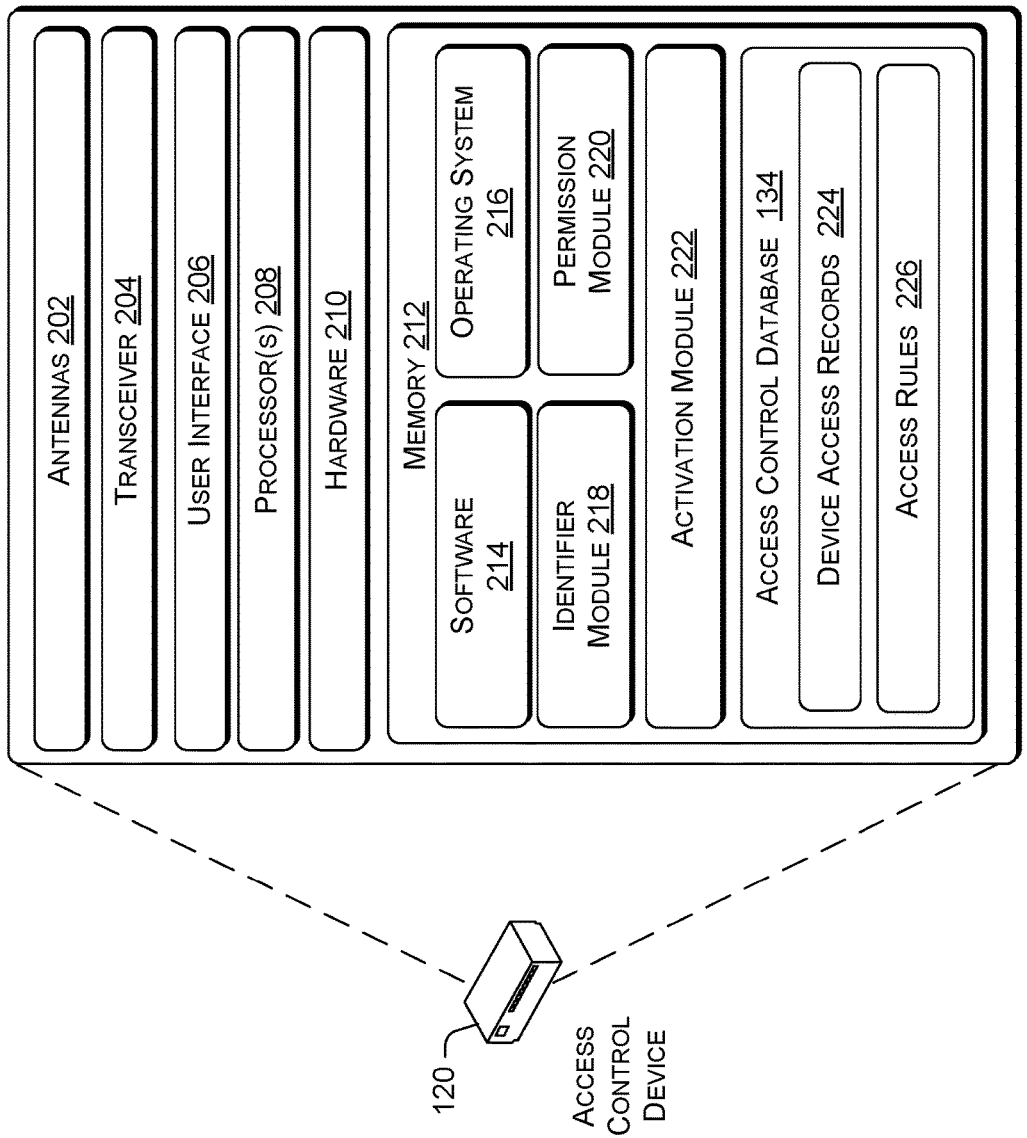
FIG. 2 is a block diagram showing various components of an access control device that is used to detect RF communications to control subscriber access to resources.

FIG. 2 is a block diagram showing various components of an access control device that is used to detect RF communications to control subscriber access to resources. The access control device 120 may include one or more antennas 202, transceiver 204, user interface 206, one or more processors 208, hardware 210, and memory 212. In some embodiments, the antennas 202 may include an uplink antenna that sends radio signals to a downlink antenna that receives radio signals. In other embodiments, a single antenna may both send and receive radio signals. The one or more antennas 202 may include an array of antenna elements. Each of the antenna elements may be a directional antenna element that is configured to receive RF signals from a particular direction. In some instances, the antenna elements may be steered mechanically to orient in different directions. For example, the antennas 202 may include a planar antenna with multiple antenna elements. The planar antenna may be equipped with servo motors that orient or reorient the planar antenna.

In other instances, the antenna elements of the antennas 202 may be phase-shifted via an electrical signal such that signal reception and/or transmission by the antennas 202 is beamformed, e.g., reinforced in a specific direction and suppressed in other directions. Accordingly, the phase shifting of the antenna may orient or reorient the antenna 202 without physically moving the antenna 202. In additional embodiments, the antennas 202 may include a directional antenna of other directional designs, so long as the directional antenna may be oriented in a specified direction. For example, the antennas 202 may include a Yagi antenna, a horn antenna, a dish reflector antenna, a slot antenna, a waveguide antenna, a Vivaldi antenna, a helix antenna, a planar antenna, a dipole array antenna, an origami antenna, etc. The transceiver 204 may include radios that receive communication signals and transmit communication signals.

The user interface 206 may enable a user to provide inputs and receive outputs from the access control device 120. The user interface 206 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods.

Each of the processors 208 may be a single-core processor, a multi-core processor, a complex instruction set computing (CISC) processor, or another type of processor. The hardware 210 may include a power source and digital signal processors (DSPs), which may include single-core or multiple-core processors. The processors may perform operations in parallel to process a continuous stream of data. The hardware 210 may also include network processors that manage high-speed communication interfaces, including communication interfaces that interact with peripheral components. The network processors and the peripheral components may be linked by switching fabric. The hardware 210 may further include hardware decoders and encoders, an antenna interface controller, a network interface controller, and/or a universal serial bus (USB) controller. The antenna interface controller may be used by the processors to transmit and receive data through radio waves. In various embodiments, the antenna interface controller may support EDGE, W-CDMA, HSPA, LTE, CDMA-2000, 4G, and 5G network communication modes.

The network interface controller may enable the processors to transmit and receive data via a wired or a wireless computer network connection. In some embodiments, the hardware 210 may also include a direct memory access (DMA) engine. The DMA engine may enable the various controllers to access the memory 212 independently of the one or more processors 208 to perform tasks. The various controllers and processors may execute instructions and perform tasks under the direction of software components that are stored in the memory 212.

The memory 212 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high definition video storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The memory 212 may store various software components that are executable or accessible by the processors and controllers of the access control device 120. The various components may include software 214, an operating system 216, an identifier module 218, a permission module 220, and an activation module 222. Each module may include routines, program instructions, objects, and/or data structures that perform particular tasks or implement particular abstract data types.

The software 214 may enable the access control device 120 to perform functions and control hardware components of the access control device 120. In various embodiments, the software 214 may include algorithms that support the sending uplink data to the core network 104. The algorithms may further support the receiving of downlink data from the core network 104. In some instances, the uplink and downlink data may originate from and be destined for user devices that are connected to the access control device 120. The algorithms may perform tasks such as channel decoding/encoding, uplink/downlink processing, computation of Fourier transforms, matrix inversions, Viterbi encoding and decoding, and/or signal convolution and filtering. The software 214 may further include basic input/output system (BIOS), bootrom, or a bootloader that boots up the access control device 120 and executes the operating system 216.

The operating system 216 may include components that enable the access control device 120 to receive and transmit data via various interfaces (e.g., user interface 206, communication interfaces, etc.). The operating system 216 may also process data using the one or more processors 208 to generate outputs based on inputs that are received via the user interface 206. For example, the operating system 216 may provide an execution environment for the execution of the software 214 and other software applications. The operating system 216 may include an output component that presents the output (e.g., display the data on an electronic display, store the data in memory, transmit the data to another electronic device, etc.). Additionally, the operating system 216 may include other components that perform various other functions generally associated with an operating system.

The identifier module 218 may monitor RF communications sent by a subscriber device to a base station on one or more frequency bands allocated to the wireless carrier network 102. For example, the one or more frequency bands may include frequency bands that are licensed to the MNO of the wireless carrier network 102 by a government regulatory agency. Accordingly, the identifier module 218 may extract a device identifier of the subscriber device from an RF communication transmitted by the subscriber. Following the extraction of the device identifier, the identifier module 218 may submit the device identifier to the eligibility controller 136 for a determination of whether the subscriber associated with the device identifier of the subscriber device is eligible to access a resource. In response, the identifier module 218 may receive either an indication that the subscriber associated with the device identifier is eligible or an indication that the subscriber associated with the device identifier is ineligible.

The permission module 220 may be activated by the identifier module 218 to determine whether a subscriber device associated with a device identifier is permitted to access the resource. In various embodiments, the identifier module 218 may activate the permission module 220 in response to an indication that the subscriber associated with the device identifier is eligible for the resource. In turn, the permission module 220 may use the access control database 134 stored in the memory 212 to determine whether the subscriber device is permitted to access the resource. The access control database 134 may contain device access records 224 and one or more access rules 226. The device access records 224 may record instances of access to resources by subscribers using subscriber devices, in which the records are indexed by corresponding device identifiers. The one or more access rules 226 indicate one or more conditions for accessing a resource. For example, an access rule may dictate that the subscriber device is permitted to access a resource only once or for a limited number of times. In another example, an access rule may specify that a subscriber device is permitted to access a resource only once or for a limited number of times in a predetermined time period. In an additional example, an access rule may dictate that a limited number of subscriber devices are able to access a resource in a designated time period (e.g., one hour, one day, one week, etc.). Accordingly, the permission module 220 may use the device access records 224 to ascertain whether the number of subscriber devices that accessed a resource has reached the number limit for the designated time period. Once the number limit is reached for the designated time period, the permission module 220 may deny additional subscriber devices access to the resource. Alternatively, or concurrently, an access rule may dictate that a predetermined number of subscriber devices are only allowed to access a resource at a specific date and/or time.

In some embodiments, the device access records 224 may be in the form of anonymized access records. In such embodiments, the permission module 220 may use a hash algorithm to generate a hashed device identifier from the device identifier. For example, the hash algorithm may be one of a Secure Hash Algorithm (SHA) 256, an Elliptic Curve Digital Signature Algorithm (ECDSA), a Probabilistic Signature Scheme (PSS), etc. Subsequently, the permission module 220 may search the access control database 134 to determine whether an anonymized device access record that is indexed by a corresponding hashed device identifier exists in the database. Assuming that such an anonymized device access record exists, the permission module 220 may read the anonymized device access record to determine whether the subscriber device contained in the record was previously used to access the resource, and if so, the number of times that the device was used to access the resource. Such access information of the subscriber device is then compared by the permission module 220 with one or more corresponding access rules stored in the access control database 134 to determine whether the subscriber device is permitted to access the resource. However, in the event that no anonymized device access record exists, the permission module 220 may generate an anonymized device access record for the subscriber device. Thus, assuming that the subscriber device is permitted to access the resource, the permission module 220 may store an access instance in the anonymized device access record once the activation module 222 is directed by the permission module 220 to initiate an access. The storing of an access instance may include storing a date of the access, a time of the access, the identification information of the resource accessed, a unique access identifier assigned to the access, and/or other information. Conversely, if the subscriber device is not permitted to access the resource, the permission module 220 may store an access denial instance in the anonymized device access record. In alternative embodiments, the permission module 220 may access, check, and/or generate records that are not anonymized in a similar manner.

In some embodiments, the permission module 220 may be configured to activate the user interface 206 of the access control device 120 to indicate whether a subscriber device is permitted or denied access to a resource. The indications that are provided via the user interface 206 may include visual alerts and/or audio alerts. For example, when a subscriber device is permitted access, the visual alert may include an indicator light of a first color and/or a first visual message that is displayed to indicate access is granted. In some instances, such a visual alert may be accompanied by a first audio tone and/or a first pre-recorded audio message indicating access is granted. Conversely, when the subscriber device is denied access, the visual alert may be an indicator light of a second color and/or a second visual message that is displayed to indicate access is denied. In some instances, such a visual alert may be accompanied by a second audio tone and/or a second pre-recorded audio message indicating access is denied.

The activation module 222 may be directed by the permission module 220 to initiate an access to a resource for a subscriber device. The activation module 222 may initiate an access to a resource when the subscriber device is within a predetermined range of the access control device 120. In some embodiments, the activation module 222 may determine that the subscriber device is within the predetermined range when a communication signal robustness value of an RF communication transmitted by the subscriber device exceeds a corresponding value threshold. For example, the signal robustness value may be expressed in a multitude of ways, such as a signal strength value or a signal quality value. Signal strength may be measured via received signal strength indicator (RSSI), reference signal received power (RSRP), received channel power indicator (RCPI), or other signal strength measurements. Signal quality may be measured through energy to interface ratio (ECIO), reference signal received quality (RSRQ), signal to interference-plus-noise ratio (SINR), or other signal quality measurements.

In some instances, the activation module 222 may initiate access to a resource by activating an access control barrier (e.g., the access control barrier 140) to permit a person that is in possession of the subscriber device entry to a venue. In such instances, the access control device 120 may be communicatively coupled to an actuator of the barrier via a wired connection (e.g., USB, ethernet, etc.) or a short-range wireless connection (e.g., Bluetooth, Wi-Fi, etc.). Accordingly, the access control device 120 may send a command to the actuator to unlock or move the access control barrier in order to permit access. In alternative instances, the access control barrier may be equipped with a sensor that detects the presence of a person near the access control barrier. The sensor may be a motion sensor, a pressure sensor, an infrared sensor, etc. In such instances, the activation module 222 may activate the access control barrier to permit entry when a person is detected near the access control barrier and the subscriber device is within a predetermined range of the access control device 120.

In other instances, the activation module 222 may initiate access to an online resource or authorize an online purchase of an offered product or service by a subscriber device by sending an authorization token that is associated with a corresponding device identifier to the eligibility controller 136. In turn, the eligibility controller 136 may use the device identifier to identify the subscriber device and send a notification of the available resource access to the subscriber device corresponding to the device identifier via the wireless carrier network 102. For example, the notification may be sent via an email, a message, or an alert for presentation by a client application on the subscriber device. The authorization token may have an expiration date. Thus, when the subscriber device is used by a subscriber to access the online resource or make the online purchase of the offered product or service, the eligibility controller 136 may determine whether a valid (e.g., non-expired) authorization token exists for the subscriber device. In this way, a subscriber may use the subscriber device to access the online resource or make the purchase from a designated web portal as long as the authorization token remains valid. For example, the web portal may be operated by the MNO. In another example, the web portal may be operated by a third-party partner of the MNO, and a web server providing the web portal may be configured to query the eligibility controller 136 for the existence of the valid authorization token. In such instances, the authorization token is provided to a subscriber device while the subscriber device is within a predetermined range of the access control device 120. However, the subscriber device may access the resource either in or out of the predetermined range of the access control device as long as the authorization token is valid.

In other embodiments in which the access control device 120 may be a modified low-powered network cell (e.g., a picocell or femtocell), the activation module 222 may initiate access to a resource when the subscriber device transitions from being connected to a base station (e.g., base station 106(1)) to being connected to the access control device 120. Since a low-powered network cell generally has very limited communication range, such a transition may be used as an indication that the subscriber device is located with a predetermined range of the access control device 120. In some instances, such an indication that the subscriber device is located with a predetermined range of the access control device 120 may be used in conjunction with a sensor of an access control barrier to activate the access control barrier for entry in a similar manner as described above.

Example Eligibility Controller

Figure 3:
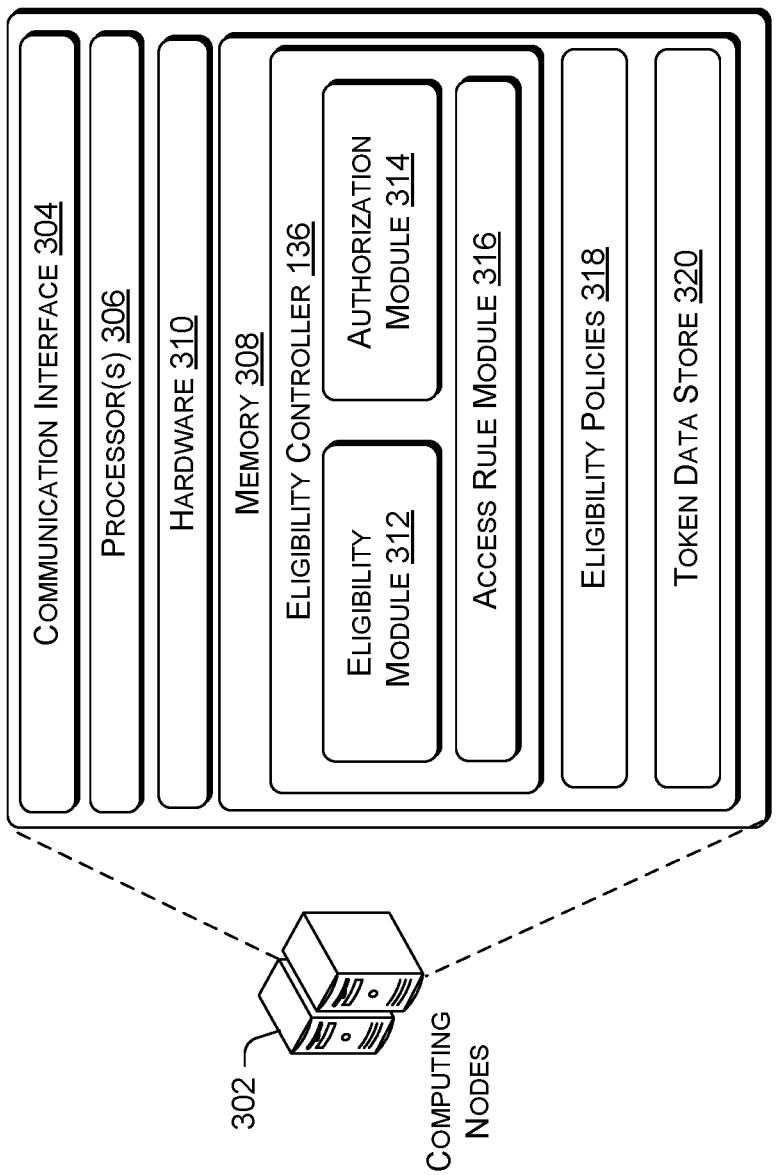
FIG. 3 is a block diagram showing various components of an eligibility controller of a wireless carrier network that determines subscriber eligibility to access resources.

FIG. 3 is a block diagram showing various components of an eligibility controller of a wireless carrier network that determines subscriber eligibility to access resources. The eligibility controller 136 may be implemented by computing nodes 302. The computing nodes or components thereof may include servers, virtual computing devices in the form of virtual machines, or software containers that are hosted in a computing cloud with hardware at different geographical locations. The computing nodes 302 may include a communication interface 304, one or more processors 306, and memory 308. The communication interface 304 may include wireless and/or wired communication components that enable the one or more computing nodes 302 to transmit data to and receive data from other networked devices. The computing nodes 302 may be accessed via hardware 310. The hardware 310 may include additional user interface, data communication, or data storage hardware. For example, the user interface may include a data output device (e.g., visual display, audio speakers), and one or more data input devices. The data input devices may include, but are not limited to, combinations of one or more of keypads, keyboards, mouse devices, touch screens that accept gestures, microphones, voice or speech recognition devices, and any other suitable devices.

The memory 308 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms.

The eligibility controller 136 may be stored in the memory 308 and executed by the one or more processors 306. The eligibility controller 136 may include an eligibility module 312 and an authorization module 314. The modules may include routines, program instructions, objects, and/or data structures that perform particular tasks or implement particular abstract data types.

The eligibility module 312 may receive a device identifier from the access control device 120. In turn, the eligibility module 312 may use the device identifier to determine whether a subscriber associated with the subscriber device identified by the device identifier is eligible to access one or more resources. In various embodiments, the eligibility module 312 may query a device management database or a user account database with a device identifier to identify a subscriber account of a subscriber associated with the subscriber device, i.e., the subscriber registered as the user of the subscriber device. In some embodiments, the device management device and the user account database may be databases managed by a Business Support System (BSS) and/or an Operation Support System (OSS) in the core network 104. Subsequently, the eligibility module 312 may retrieve the subscriber account information of the associated subscriber. The subscriber account information is then compared by the eligibility module 312 to one or more eligibility policies 318 for accessing the one or more resources. The eligibility policies 318 may specify whether a subscriber is eligible based on the type of subscriber account that the subscriber has with the MNO (e.g., prepaid account vs. postpaid account), whether the subscriber is current on payments to the MNO for telecommunication services, the age of the subscriber, and/or one or more other eligibility criteria. In some instances, the subscriber may be an authorized user on a subscriber account of a primary account holder. In such instances, information regarding the subscriber account of the primary account holder may be used to determine eligibility. For example, the eligibility module 312 may determine that the subscriber is ineligible if the subscriber account is a prepaid account instead of a postpaid account. In another example, the subscriber may be ineligible if the subscriber account shows the subscriber is delinquent in payments to the MNO for a predetermined amount of time, such as several months in a row. Accordingly, the comparison performed by the eligibility module 312 may provide an eligibility status of the associated subscriber. The eligibility status is conveyed by the eligibility module 312 to the access control device 120 via a corresponding eligibility indicator.

The authorization module 314 may receive an authorization token that is associated with a device identifier from the access control device 120. In turn, the authorization module 314 may store the authorization token in a token data store 320. Thus, when the subscriber device identified by the device identifier is used to access the online resource or performance the online purchase transaction of the offered product and/or service, the eligibility controller 136 may determine whether a valid (e.g., non-expired) authorization token exists for the subscriber device. For example, the authorization module 314 may receive an authorization query from a web server that provides a web portal when the web portal receives a request to access a resource from a subscriber device. The web server may be operated by the MNO or a third-party partner of the MNO. The authorization query may include a device identifier of the subscriber device and an inquiry as to whether the access is authorized. Thus, when the eligibility controller 136 determines that a valid (e.g., non-expired) authorization token exists for the subscriber device, the eligibility controller 136 may notify the web server that the access is authorized. Otherwise, the eligibility controller 136 may notify the web server that the access is not authorized.

The access rule module 316 may enable an administrator of the eligibility controller 136 to configure or modify the access rules that are used by access control devices, such as the access control device 120. In various embodiments, the access rule module 316 may provide an administrative portal that enables an administrator to configure or modify access rules for resources that are associated with individual promotional offers. The administrator may access the administrative portal via a website or an IP address using a web browser, or an administrative application installed on an administrative device. The administrator may authenticate to the administrative portal using authentication credentials (e.g., user identifier, password, biometric data, etc.) of an administrator account that the administrator previously established with the eligibility controller 136. In turn, the administrative portal may present checkboxes, selection menus, and/or other user interface controls that enable the administrator to configure or modify individual access rules.

For example, the administrator may generate an access rule that enables a predetermined number of subscribers to access a resource located at a particular location at a specific date and/or time. In another example, the administrator may modify an existing access rule to change the date and/or time at which a resource may be accessed. In still another example, the administrator may delete an access rule for a resource of a promotional offer or reapply the access rule to a resource of another promotional offer following termination of the promotional offer. Following the configuration or modification of an access rule, the administrator may use the access rule module 316 to send the access rule to an access control device via a rule update to an access control database of the device. For example, the access control module 316 may call or invoke a database update function of the database to perform the rule update. The access rule may be sent by the access rule module 316 to an access control device using wireless or wired communication.

Example Processes

Figure 4:
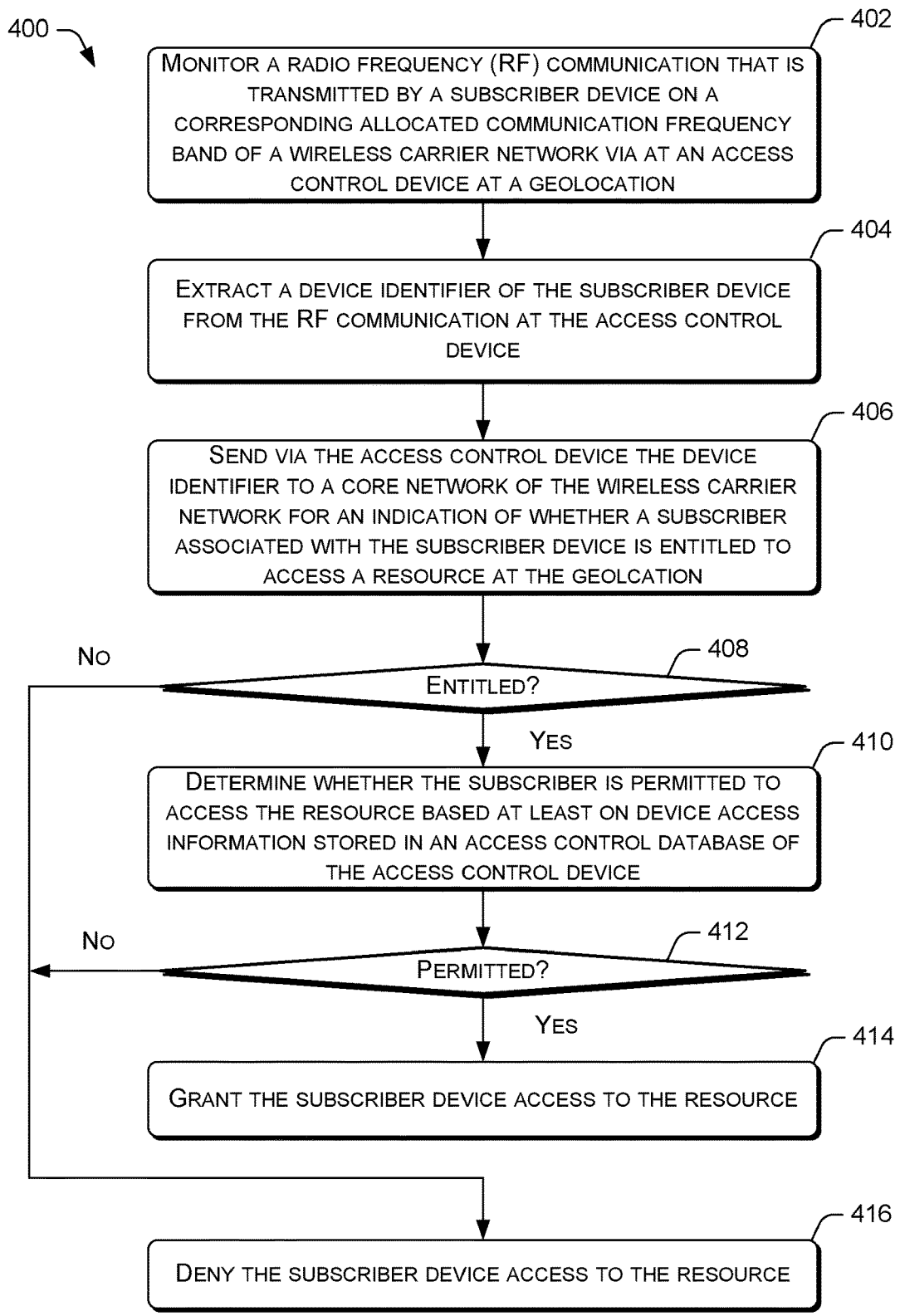
FIG. 4 is a flow diagram of an example process for an access control device to use RF communications from a subscriber device to control subscriber access to resources.
Figure 5:
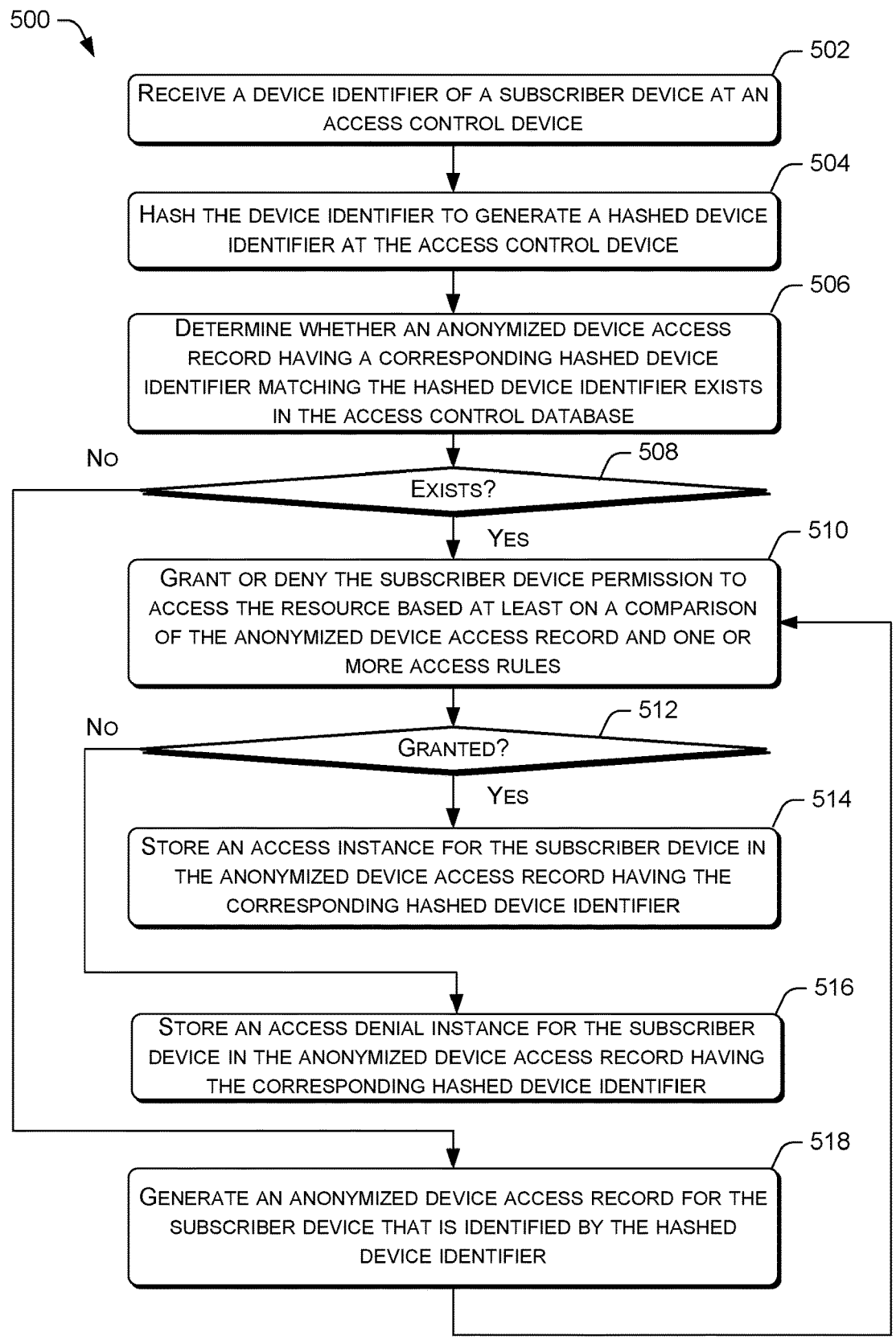
FIG. 5 is a flow diagram of an example process for an access control device to use an access database of anonymized device access records to grant or deny a subscriber device access to resources.

FIGS. 4 and 5 present illustrative processes 400 and 500 for using RF communications detection to control subscriber access to resources. Each of the processes 400 and 500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400 and 500 are described with reference to the architecture 100 of FIG. 1.

FIG. 4 is a flow diagram of an example process 400 for an access control device to use an RF communications from a subscriber device to control subscriber access to resources. At block 402, the access control device 120 deployed at a geolocation may monitor an RF communication that is transmitted by a subscriber device on a corresponding allocated communication frequency band of a wireless carrier network.

At block 404, the access control device 120 may extract a device identifier of the subscriber device from the RF communication at the access control device. At block 406, the access control device 120 may send the device identifier to a core network 104 of the wireless carrier network 102 for an indication of whether a subscriber associated with the subscriber device is entitled to access a resource at the geolocation.

At decision block 408, if the core network 104 indicates that the subscriber associated with the subscriber device is entitled to access the resource at the geolocation, the process 400 may proceed to block 410. At block 410, the access control device 120 may determine whether the subscriber device is permitted to access the resource based at least on device access information stored in an access control database of the access control device. In various embodiments, the device accesses information may include one or more device access records and one or more access rules that regulate access to resources. For example, an access rule may dictate that a subscriber device is permitted to access a resource only once or for a limited number of times. In another example, an access rule may specify that the subscriber device is permitted to access a resource only once or for a limited number of times in a predetermined time period. Alternatively, or concurrently, an access rule may dictate that the subscriber device is only allowed to access a resource at a specific date and/or time. At decision block 412, if the access control device 120 determines that the subscriber device is permitted to access the resource, the process 400 may proceed to block 414. At block 414, the access control device 120 may grant the subscriber device access to the resource.

Returning to decision block 408, if the core network 104 indicates that the subscriber associated with the subscriber device is not entitled to access the resource at the geolocation, the process 400 may proceed to block 416. At block 416, the access control device 120 may deny the subscriber device access to the resource. In some instances, the access control device 120 may send an indication of denial to a client application on the subscriber device for presentation to the subscriber. Returning to decision block 412, if the access control device 120 determines that the subscriber device is not permitted to access the resource, the process 400 may also proceed to block 416.

FIG. 5 is a flow diagram of an example process 500 for an access control device to use an access database of anonymized device access records to grant or deny a subscriber device access to resources. The example process 500 may further illustrate block 410 of the process 400. At block 502, the access control device 120 may receive a device identifier of a subscriber device.

At block 504, the access control device 120 may hash the device identifier to generate a hashed device identifier. In various embodiments, the access control device 120 may use a hash algorithm to generate the hashed device identifier from the device identifier. For example, the hash algorithm may be one of Secure Hash Algorithm (SHA) 256, Elliptic Curve Digital Signature Algorithm (ECDSA), Probabilistic Signature Scheme (PSS), etc.

At block 506, the access control device 120 may determine whether an anonymized device access record having a corresponding hashed device identifier matching the hashed device identifier exists in the access control database. At decision block 508, if the access control device 120 determines that such a record exists, the process 500 may proceed to block 510. At block 510, the access control device 120 may grant or deny the subscriber device permission to access the resource based at least on a comparison of the anonymized device access record and one or more access rules.

At decision block 512, if the access control device 120 grants the subscriber access to the resource, the process 500 may proceed to block 514. At block 514, the access control device 120 may store an access instance for the subscriber device in the anonymized device access record having the corresponding hashed device identifier in the access control database. Returning to decision block 512, if the access control device 120 denies the subscriber access to the resource, the process 500 may proceed to block 516. At block 516, the access control device 120 may store an access denial instance for the subscriber device in the anonymized device access record having the corresponding hashed device identifier in the access control database.

Returning to decision block 508, if the access control device 120 determines that no such record exists, the process 500 may proceed to block 518. At block 518, the access control device 120 may generate an anonymized device access record for the subscriber device that is identified by the hashed device identifier. Subsequently, the process 500 may proceed to block 510.

The techniques may enable an MNO to selectively provide subscribers of the MNO with access to resources at various geolocations without the subscribers having to keep track of and sign up in advance for access to such resources. Accordingly, the techniques may provide a more convenient way to allow subscribers to take advantage of promotions and offers sponsored by the MNO.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
    monitoring, via an access control device, a radio frequency (RF) communication that is transmitted by a subscriber device to a base station of a wireless carrier network on a corresponding allocated communication frequency of the wireless carrier network;
    extracting, at the access control device, a device identifier of the subscriber device from the RF communication that is transmitted by the subscriber device to the base station;
    sending, via the access control device, the device identifier to a core network of the wireless carrier network for an indication of whether a subscriber associated with the subscriber device is eligible to access a resource;
    in response to receiving a notification from the core network that the subscriber is eligible to access the resource, determining, at the access control device, whether the subscriber device with the device identifier is permitted to access the resource based at least on device access information stored in an access control database of the access control device; and
    granting the subscriber device access to the resource when the device access information indicates that the subscriber device is permitted to access the resource and the subscriber device transitions from being connected to the base station of the wireless carrier network to being connected to the access control device.

2. The computer-implemented method of claim 1, further comprising:
    hashing, at the access control device, the device identifier of the subscriber device via a hash algorithm to generate a hashed device identifier; and
    storing an anonymized device access record that is identified by the hashed device identifier for the access to the resource by the subscriber device to the resource in the access control database.

3. The computer-implemented method of claim 1, wherein the device identifier includes at least one of an International Mobile Subscriber Identity (IMSI), International Mobile Equipment Identity (IMEI), a Mobile Station International Subscriber Directory Number (MSISDN), or a Temporary Mobile Subscriber Identity (TMSI).

4. The computer-implemented method of claim 1, wherein the determining includes:
    hashing the device identifier via a hash algorithm to generate a hashed device identifier; and
    comparing the hashed device identifier to one or more anonymized device access records that are identified by one or more corresponding hashed device identifiers to determine whether the subscriber device is permitted to access the resource.

5. The computer-implemented method of claim 1, wherein the determining further includes comparing information in the one or more device access records to one or more access rules in the device access information that restrict the subscriber device to a predetermined number of accesses to the resource in a predetermined time period, dictate that a limited number of subscriber devices are able to access a resource in a designated time period, or dictate that the subscriber device is only allowed to access the resource at one or more of a specific date or a specific time.

6. The computer-implemented method of claim 1, wherein the granting the subscriber device access includes actuating an access control barrier to permit the subscriber device entry to a venue, providing an application on the subscriber device with access to an online resource, or authorizing the application on the subscriber device to perform a purchase transaction.

7. The computer-implemented method of claim 6, wherein the authorizing includes authorizing the application to perform a purchase transaction using a subscriber account that the subscriber established with a mobile network operator (MNO) that operates the wireless carrier network.

8. The computer-implemented method of claim 1, wherein the determining includes determining whether the subscriber device is permitted to access the resource by at least using the device identifier of the subscriber device to access one or more device access records of the device access information.

9. The computer-implemented method of claim 8, wherein the device access records document any prior access to the resource using the subscriber device with the device identifier.

10. The computer-implemented method of claim 1, wherein the access control device is a low-powered network cell of the wireless carrier network.

11. One or more non-transitory computer-readable media of an access control device storing computer-executable instructions that upon execution cause the access control device to perform acts comprising:
    monitoring a radio frequency (RF) communication that is transmitted by a subscriber device to a base station of a wireless carrier network on a corresponding allocated communication frequency of the wireless carrier network;
    extracting a device identifier of the subscriber device from the RF communication that is transmitted by the subscriber device to the base station;
    sending the device identifier to a core network of the wireless carrier network for an indication of whether a subscriber associated with the subscriber device is eligible to access a resource;
    in response to receiving a notification from the core network that the subscriber is eligible to access the resource, determining whether the subscriber device with the device identifier is permitted to access the resource based at least on device access information stored in an access control database of the access control device; and
    granting the subscriber device access to the resource when the device access information indicates that the subscriber device is permitted to access the resource and the subscriber device transitions from being connected to the base station of the wireless carrier network to being connected to the access control device.

12. The one or more non-transitory computer-readable media of claim 11, wherein the device identifier includes at least one of an International Mobile Subscriber Identity (IMSI), International Mobile Equipment Identity (IMEI), a Mobile Station International Subscriber Directory Number (MSISDN), or a Temporary Mobile Subscriber Identity (TMSI).

13. The one or more non-transitory computer-readable media of claim 11, wherein the device access information include one or more access rules that restrict the subscriber device to a predetermined number of accesses to the resource in a predetermined time period, dictate that a limited number of subscriber devices are able to access the resource in a designated time period, or dictate that the subscriber device is only allowed to access the resource at one or more of a specific date or a specific time.

14. The one or more non-transitory computer-readable media of claim 11, wherein the granting the subscriber device access includes actuating an access control barrier to permit the subscriber device entry to a venue, providing an application on the subscriber device with access to an online resource, or authorizing the application on the subscriber device to perform a purchase transaction.

15. The one or more non-transitory computer-readable media of claim 11, wherein determining includes determining whether the subscriber device is permitted to access the resource by at least using the device identifier of the subscriber device to access one or more device access records of the device access information.

16. The one or more non-transitory computer-readable media of claim 15, wherein device access records document any prior access to the resource using the subscriber device with the device identifier.

17. The one or more non-transitory computer-readable media of claim 15, wherein the access control device is a low-powered network cell of the wireless carrier network.

18. An access control device, comprising:
one or more processors; and
memory including a plurality of computer-executable components that are executable by the one or more processors to perform a plurality of actions, the plurality of actions comprising:
monitoring a radio frequency (RF) communication that is transmitted by a subscriber device to a base station of a wireless carrier network on a corresponding allocated communication frequency of the wireless carrier network;
extracting a device identifier of the subscriber device from the RF communication that is transmitted by the subscriber device to the base station;
sending the device identifier to a core network of the wireless carrier network for an indication of whether a subscriber associated with the subscriber device is eligible to access a resource;
in response to receiving a notification from the core network that the subscriber is eligible to access the resource, determining whether the subscriber device with the device identifier is permitted to access the resource based at least on device access information stored in an access control database of the access control device; and
granting the subscriber device access to the resource when the device access information indicates that the subscriber device is permitted to access the resource and the subscriber device transitions from being connected to the base station of the wireless carrier network to being connected to the access control device.

19. The access control device of claim 18, wherein the granting the subscriber device access includes actuating an access control barrier to permit the subscriber device entry to a venue, and at least one of providing an application on the subscriber device with access to an online resource, or authorizing the application on the subscriber device to perform a purchase transaction.

20. The access control device of claim 18, wherein the device access information includes one or more access rules that restrict the subscriber device to a predetermined number of accesses to the resource in a predetermined time period, dictate that a limited number of subscriber devices are able to access a resource in a designated time period, or dictate that the subscriber device is only allowed to access the resource at one or more of a specific date or a specific time.

* * * * *